United States Patent

Stigter et al.

[11] Patent Number: 5,907,022
[45] Date of Patent: May 25, 1999

[54] CYCLIC KETONE PEROXIDES AS POLYMER INITIATORS

[75] Inventors: Leonie Arina Stigter, Driebergen; John Meijer, Deventer; Andreas Petrus van Swieten, Velp, all of Netherlands

[73] Assignee: Akzo Nobel nv, Arnhem, Netherlands

[21] Appl. No.: 08/913,026

[22] PCT Filed: Mar. 6, 1996

[86] PCT No.: PCT/EP96/01012

§ 371 Date: Feb. 27, 1998

§ 102(e) Date: Feb. 27, 1998

[87] PCT Pub. No.: WO96/27620

PCT Pub. Date: Sep. 12, 1996

[30] Foreign Application Priority Data

Mar. 6, 1998 [EP] European Pat. Off. ............. 95200542

[51] Int. Cl.$^6$ ................................................. C08F 4/38
[52] U.S. Cl. .................. 526/228; 526/317.1; 526/303.1; 526/332; 526/335; 526/342; 526/347
[58] Field of Search ................ 526/317.1, 228, 526/303.1, 332, 335, 342, 347

[56] References Cited

U.S. PATENT DOCUMENTS

| 3,003,000 | 10/1961 | Milas | 260/610 |
|---|---|---|---|
| 3,149,126 | 9/1964 | Milas | 260/338 |
| 3,632,606 | 1/1972 | Talbott et al. | 260/338 |
| 3,734,996 | 5/1973 | Bade et al. | 423/83 |

FOREIGN PATENT DOCUMENTS

| 1 072 728 | 6/1967 | European Pat. Off. | C07C 73/00 |
|---|---|---|---|
| 1 330 896 | 8/1973 | European Pat. Off. | C08F 1/60 |
| 1 329 859 | 9/1973 | European Pat. Off. | C08F 1/60 |
| 54-28391 | 3/1979 | Japan | 526/227 |
| WO 96/03397 | 2/1996 | WIPO | C07D 323/00 |
| WO 96/03444 | 2/1996 | WIPO | C08F 8/50 |

OTHER PUBLICATIONS

Uhlmann, 3rd Edition, vol. 13, pp. 248–259 (1962), *Peroxoverbindungen, anorganische*.

Milas, N.A. and Golubovic, A., "Studies in Organic Peroxides. XXV Preparation, Separation and Identification of Peroxides Derived from Methyl Ethyl Ketone and Hydrogen Peroxide.", J. Am. Chem. Soc, vol. 81, pp. 5824–5826 (1959).

Swern, D., Wiley–Interscience, New York (1970), Chapter 3, pp. 24–27 & 30–32, vol. 1 *Organic Peroxides*.

Houben–Weyl Methoden der Organische Chemie, E13, vol. 1, p. 736.

International Search Report, dated Jun. 20, 1996.

*Primary Examiner*—Bernard Lipman
*Assistant Examiner*—N. Sarofim
*Attorney, Agent, or Firm*—Ralph J. Mancini

[57] ABSTRACT

A process for the preparation of (co)polymers employing a peroxide composition comprising at least one organic peroxide wherein at least 20% of the total active oxygen content of said organic peroxide is attributable to one or more cyclic ketone peroxides represented by the following formulas I–III:

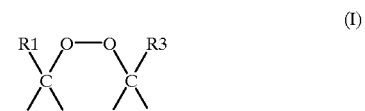

(I)

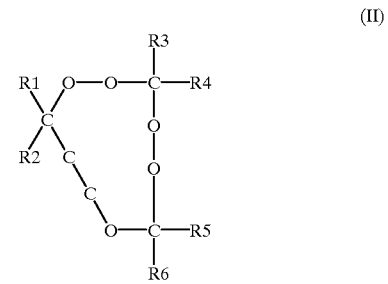

(II)

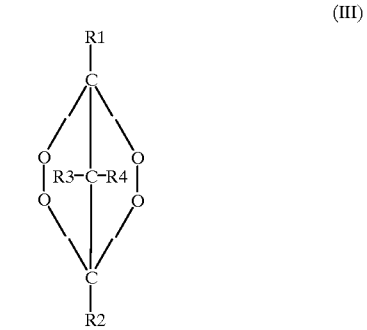

(III)

These cyclic ketone peroxides are highly efficient as polymerization initiators. Also new cyclic ketone peroxides and compositions comprising such compounds are provided,

8 Claims, No Drawings

CYCLIC KETONE PEROXIDES AS POLYMER INITIATORS

FIELD OF THE INVENTION

The present invention relates to a process for the preparation of (co)polymers which employs cyclic ketone peroxides and to the use of these cyclic ketone peroxides as initiators in (co)polymerization.

BACKGROUND OF THE INVENTION

A wide variety of peroxy compounds is known from the literature as initiators for polymer production. A fairly great number of these are commercially used. See, for example, the product catalogue of Akzo Nobel entitled "Initiators for polymer production", 1992, in which several dozens of initiators for radical polymerization have been mentioned under the trademarks Laurox®, Lucidol®, Perkadox® and Trigonox®. Other examples of commercially available initiators are included in the Akzo Nobel range of products sold under the trademarks Butanox® and Cyclonox®, respectively [1].

[1] Laurox®, Lucidol®, Perkadox®, Trigonox®, Butanox® and Cyclonox® are registered trademarks of Akzo Nobel N.V.

Commercially available initiators for polymer production may be classified in different chemical groups, which include diacylperoxides, peroxydicarbonates, dialkylperoxides, peroxyesters, peroxyketals, hydroperoxides, and ketone peroxides.

Various ketone peroxides have also been described in the literature as radical polymerization initiators in the (co)polymerization of ethylenically unsaturated monomers.

For example, U.S. Pat. No. 3,149,126 discloses some peroxides derived from the interaction of 1,3- and 1,4-diketones, which are said to be useful inter alia as catalysts in polymerization reactions and in the cross-linking of polymers. The cyclic ketone peroxide identified as Compound VII is only obtained in an analytical amount and described as very volatile, sensitive to shock and exploding with considerable brisance.

U.S. Pat. 3,003,000 discloses a group of peroxides which are said to be useful as catalysts in polymerization reactions and as accelerators of diesel fuel combustion. These formulations may include cyclic ketone peroxides which are formed in side reactions leading to cyclic condensations products. However, the compositions disclosed in this reference clearly contain only minor amounts of cyclic ketone peroxides.

U.S. Pat. No. 3,632,606 discloses fluorinated organic cyclic peroxides which are stated to be much more stable thermally than the corresponding hydrocarbon cyclic peroxides, which can be used, besides their utility as oxidants, as polymerization initiators.

German Offenlegungsschrift 21 32 315 discloses trimeric cycloketone peroxides and in particular tricycloalkylidenperoxides are said to be useful as initiators for polymerization. The disclosure merely concentrates on synthetical aspects of preparing these structures.

British Patent 827,511 discloses formulations of ketone peroxides in paraffinic diesel oil. These formulations may include cyclic ketone peroxides though the goal of this publication is to minimize the amount of cyclic peroxide present in the compositions and thus such compositions contain only minor amounts of cyclic ketone peroxides. Moreover, the reference does not suggest the use of these formulations in polymer production.

British Patent 912,061 discloses formulations of ketone peroxides in dimethyl phthalate and paraffinic diesel oil. These formulations may contain minor amounts of cyclic ketone peroxides. No teaching was given with respect to the possible use as initiators for polymerization.

British Patent 1,072,728 discloses stabilized ketone peroxide compositions formulated in safety solvents which are selected from alcohols and glycols. Such compositions optionally contain diluents other than the safety solvents, such diluents being phthalate esters. These ketone peroxide formulations also contain only minor proportions of cyclic ketone peroxides. Again, no teaching was given as to the possible use as polymerization initiators.

International Patent Applications PCT/EP95/02829 and PCT/EP95/ 02830, both filed on Jul. 14, 1995 and not prepublished, disclose transportable, storage stable cyclic ketone peroxide compositions comprising 1.0–90% by weight of one or more cyclic ketone peroxides and 10–99% by weight of one or more diluents selected from the group of liquid phlegmatizers, plasticizers, solid polymeric carriers, inorganic supports, organic peroxides, and mixtures thereof, as well as the use of these cyclic ketone peroxide formulations in the modification of (co)polymers.

Commercial formulations of methylethyl ketone peroxide and methylisobutyl ketone peroxide are known to be mixtures of several different ketone peroxide compounds, among which the non-cyclic ketone peroxides predominate. However, these ketone peroxides do contain some small quantities of cyclic ketone peroxides which result from side reactions during the preparation of the methylethyl and methylisobutyl ketone peroxides. For example, in commercially available methylethyl ketone peroxides about 1–4% of the total active oxygen content is attributable to cyclic ketone peroxides.

Although the aforementioned peroxides are known for use in the initiation of polymerization reactions, their performance in, for example, acrylic (co)polymerization and the curing of unsaturated polyesters at higher temperatures (i.e. above about 100° C.), is disappointing and they often cause yellowing of the polymer. Furthermore, many commercially available peroxides generate undesired by-products.

Accordingly, there remains a need in the art for polymerization initiators which provide improved performance. These and other objects of the present invention will be apparent from the summary and detailed description of the present invention which follow.

SUMMARY OF THE INVENTION

In one aspect, the present invention relates to a process for the preparation of (co)polymers of ethylenically unsaturated monomers employing a peroxide composition comprising at least one organic peroxide as an initiator. The process is further characterized in that at least 20%, preferably from about 50%, for example 60%, and most preferably about 70% of the total active oxygen content of the organic peroxide is attributable to at least one cyclic ketone peroxide selected from peroxides represented by the formulas I–III:

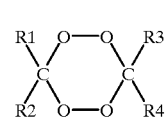

(I)

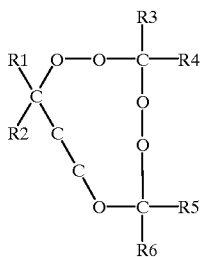

(II)

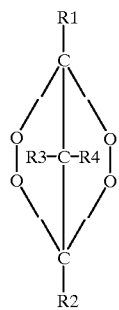

(III)

wherein $R_1$–$R_6$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, which groups may include linear or branched alkyl moieties; and each of $R_1$–$R_6$ may be optionally substituted with one or more groups selected from $C_1$–$C_{20}$ alkyl, linear or branched, $C_3$–$C_{20}$ cycloalkyl, $C_6$–$C_{20}$ aryl, $C_7$–$C_{20}$ aralkyl, hydroxy, $C_1$–$C_{20}$ alkoxy, $C_6$–$C_{20}$ aryloxy, $C_7$–$C_{20}$ aralkoxy, $C_7$–$C_{20}$ alkaryloxy, $R_1C(O)O$—, $R_1OC(O)$—, halogen (in particular chorine and bromine), carboxy, nitrile and amido; or $R_1/R_2$, $R_3/R_4$ and $R_5/R_6$ each may, together with the carbon atom to which they are attached, form a 3 to 20 atoms membered cycloaliphatic ring which may be optionally substituted with one or more groups selected from $C_1$–$C_{20}$ alkyl, linear or branched, $C_3$–$C_{20}$ cycloalkyl, $C_6$–$C_{20}$ aryl, $C_7$–$C_{20}$ aralkyl, hydroxy, $C_1$–$C_{20}$ alkoxy, $C_6$–$C_{20}$ aryloxy, $C_7$–$C_{20}$ aralkoxy, $C_7$–$C_{20}$ alkaryloxy, $R_1C(O)O$—, $R_1OC(O)$—, halogen (in particular chorine and bromine), carboxy, nitrile and amido.

In another aspect, the present invention also relates to new cyclic ketone peroxides with the formulas I–III wherein $R_1$–$R_6$ have the meanings defined above, and to compositions containing such new compounds.

In still another aspect, the present invention relates to the use of an organic peroxide composition wherein at least 20%, preferably from about 50%, for example 60%., and most preferably about 70% of the total active oxygen content is attributable to at least one cyclic ketone peroxide selected from peroxides represented by the formulas I–III wherein $R_1$–$R_6$ have the same meaning as defined above; to prepare (co)polymers.

The peroxides of the formulas I–III provide a performance in polymer initiation processes which is superior to their non-cyclic dialkyl ketone peroxide counterparts and comparable to the performance of other commercially available types of peroxides. They offer the further advantage that the amount of undesirable by-products which are generated by side-reactions of the peroxides during their decomposition, is considerably reduced.

DETAILED DESCRIPTION OF THE INVENTION

The word "(co)polymer" as used in this application should be interpreted to mean "polymers and copolymers".

The term "ketone peroxide" as used in this application should be interpreted to include peroxides derived from both ketones and aldehydes.

The peroxides of the formulas I–III can be made by reacting a ketone with hydrogen peroxide as is described in U.S. Pat. No. 3,003,000; Uhlmann, 3rd Edition, Vol. 13, pp. 256–57 (1962); the article, "Studies in Organic Peroxides. XXV. Preparation, Separation and Identification of Peroxides Derived from Methyl Ethyl Ketone and Hydrogen Peroxide," Milas, N. A. and Golubovic, A., J. Am. Chem. Soc., Vol. 81, pp. 5824–26 (1959), Organic Peroxides, Swern, D. editor, Wiley-Interscience, New York (1970) and Houben-Weyl Methoden der Organische Chemie, E13, Volume 1, page 736, the disclosures of which are hereby incorporated by reference.

Suitable ketones for use in the synthesis of the present peroxides include, for example, acetone, acetophenone, methyl-n-amyl ketone, ethylbutyl ketone, ethylpropyl ketone, methylisoamyl ketone, methylheptyl ketone, methylhexyl ketone, ethylamyl ketone, dimethyl ketone, diethylketone, dipropyl ketone, methylethyl ketone, methylisobutyl ketone, methylisopropyl ketone, methylpropyl ketone, methyl-t-butyl ketone, isobutyl-heptyl ketone, diisobutyl ketone, 2,4-pentanedione, 2,4-hexanedione, 2,4-heptanedione, 3,5-heptanedione, 3,5-octanedione, 5-methyl-2,4-hexanedione, 2,6-dimethyl-3,5-heptanedione, 2,4-octanedione, 5,5-dimethyl-2,4-hexanedione, 6-methyl-2,4-heptanedione, 1-phenyl-1,3-butanedione, 1-phenyl-1,3-pentanedione, 1,3-diphenyl-1,3-propane-dione, 1-phenyl-2,4-pentanedione, methylbenzyl ketone, phenylmethyl ketone, phenylethyl ketone, methylchloromethyl ketone, methylbromomethyl ketone and coupling products thereof. Suitable cyclic ketones include cyclopentanone, 2-methylcyclopentanone, 3-methylcyclopentanone, cyclohexanone, 2-methylcyclohexanone, 3-methylcyclohexanone, 4-methylcyclohexanone, 4-t-butylcyclohexanone, 4-t-amylcyclohexanone, 4-methoxycyclohexanone, 3,3,5-trimethylcyclohexanone, 2-chlorocyclohexanone, cycloheptanone, cyclooctanone, 2-chlorocyclooctanone, cyclononanone, cyclodecanone, cycloundecanone, cyclododecanone, cyclotridecanone, cyclotetradecanone, cyclopentadecanone, cyclohexadecanone, cycloheptadecanone, cyclooctadecanone, cyclononadecanone and cycloeicosanone.

Of course, other ketones having the appropriate R groups corresponding to the peroxides of the formulas I–III can be employed, as well as mixtures of two or more different ketones. Such mixtures also include mixtures of different ketones leading to mixed dimers and mixed trimers, mixtures of dimers of different ketones, mixtures of trimers of different ketones and mixtures of dimers and trimers of different ketones.

Examples of preferred peroxides of the formulas I–III for use in accordance with the present invention are the cyclic ketone peroxides derived from acetone, acetylacetone, methylethyl ketone, methylpropyl ketone, methylisopropyl ketone, methylbutyl ketone, methylisobutyl ketone, methylamyl ketone, methylisoamylketone, methylhexyl ketone, methylheptyl ketone, diethyl ketone, ethylpropyl ketone, ethylamyl ketone, cyclopentanone, cyclohexanone, 2-methylcyclohexanone, 3,5,5-trimethylcyclohexanone, cyclododecanone, and mixtures thereof. In the compounds of formula II, preferably no more than one or two cycloaliphatic rings are present.

The peroxides can be prepared, transported, stored and applied as such or in the form of, e.g., powders, granules, flakes, pastes and solutions. These formulations may optionally be phlegmatized, as necessary, depending on the particular peroxide and its concentration in the formulation.

Which of these forms is to be preferred partly depends on the ease of feeding the peroxide into the polymerization process. Also, considerations of safety may play a role to the extent that phlegmatizers may have to be incorporated in certain compositions to ensure their safety. As examples of suitable phlegmatizers may be mentioned solid carrier materials such as inert plasticizers, solvents and inert diluents such as silicone oils, white oils, high boiling hydrocarbons such as isododecane, and water.

The present cyclic ketone peroxides are well suited for use as initiators for polymer production and in particular the preparation of acrylic (co)polymers, polystyrene, polyethylene and the curing of unsaturated polyester resins (by processes such as SMC, BMC, pulltrusion, etc). In styrene polymerization, when using the cyclic ketone peroxides of the present invention, a low residual monomer content is achieved by either suspension or bulk polymerization. Accordingly, in one aspect the present invention comprises a process for the preparation of acrylic (co)polymers, ethylenic (co)polymers, styrenic (co)polymers, and, at higher temperatures (i.e. above about 100° C.), unsaturated polyesters, using the cyclic ketone peroxides represented in formulas I, II and III.

In the present invention, polymerization is conducted by any conventional process, except that a specified radical polymerization initiator (or composition) is used. The polymerization processes may be carried out in the usual manner, for example in bulk, suspension, emulsion or solution. In the case of production of ethylene (co)polymers the reaction is usually carried out under high pressure, e.g. about 1000 to about 3500 bar.

The amount of the initiator, which varies depending on the polymerization temperature, the capacity for removing the heat of polymerization, and, when applicable, the kind of monomer to be used and the applied pressure, should be an amount effective to achieve polymerization. Usually, from 0.001–25% weight of peroxide, based on the weight of the (co)polymer, should be employed. Preferably, from 0.001–20% weight and most preferably from 0.001–15% weight of peroxide is employed.

The polymerization temperature for most reactions within the present invention is usually 50° to 450° C., preferably 1200 to 350° C. When it is below 50° C., the polymerization time becomes too long. However, when it exceeds 450° C., the radical polymerization initiator is spent in the initial stage of the polymerization, making it difficult to attain a high conversion. In order to reduce the amount of unreacted monomer, however., it is also possible to conduct polymerization using a temperature profile, e.g. to perform the initial polymerization at 90° C. and then elevate the temperature above 115° C. to complete the polymerization. These variations are all known to the man skilled in the art, who will have no difficulty in selecting the reaction conditions of choice, depending on the particular polymerization process and the specific radical polymerization initiator to be used.

In order to clearly distinguish the present cyclic ketone peroxides from prior art ketone peroxides which contained some cyclic ketone peroxides as an impurity therein, it is required that at least 20 percent of the total active oxygen content of the peroxide(s) employed in the (co) polymerization process of the present invention be attributable to one or more cyclic ketone peroxide(s). More preferably, the cyclic ketone peroxides provide at least 50 percent of the total active oxygen content of the composition which is employed in the polymerization process, for example 60%. Most preferably, at least 70% of the total active oxygen content of the peroxide composition used in the (co)-polymerization process is attributable to the cyclic ketone peroxide(s). Comparative examples included herein demonstrate the advantages of these cyclic ketone peroxides over their non-cyclic counterparts.

During (co)polymerization, the formulations may also contain the usual additives and fillers. As examples of such additives may be mentioned: stabilizers such as inhibitors of oxidative, thermal or ultraviolet degradation, lubricants, extender oils, pH controlling substances such as calcium carbonate, release agents, colorants, reinforcing or non-reinforcing fillers such as silica, clay, chalk, carbon black and fibrous materials such as glass fibers, plasticizers, diluents, chain transfer agents, accelerators and other types of peroxides. These additives may be employed in the usual amounts.

Suitable monomers for polymerization using the cyclic ketone derived peroxides according to the present invention are olefinic or ethylenically unsaturated monomers, for example substituted or unsubstituted vinyl aromatic monomers, including styrene, α-methylstyrene, p-methylstyrene and halogenated styrenes; divinylbenzene; ethylene; ethylenically unsaturated carboxylic acids and derivatives thereof such as (meth)acrylic acids, (meth) acrylic esters, 2-ethylhexyl acrylate, 2-ethylhexyl methacrylate, and glycidyl methacrylate; ethylenically unsaturated nitriles and amides such as acrylonitrile, methacrylonitrile and acrylamide; substituted or unsubstituted ethylenically unsaturated monomers such as butadiene, isoprene and chloroprene; vinyl esters such as vinyl acetate and vinyl propionate; ethylenically unsaturated dicarboxylic acids and their derivatives including mono- and diesters, anhydrides and imides, such as maleic anhydride, citraconic anhydride, citraconic acid, itaconic acid, nadic anhydride, maleic acid, fumaric acid, aryl, alkyl and aralkyl citraconimides and maleimides; vinyl halides such as vinyl chloride and vinylidene chloride; vinylethers such as methylvinylether and n-butyl-vinylether; olefins such as isobutene and 4-methylpentene; allyl compounds such as (di)allyl esters, for example diallyl phthalates, (di)allyl carbonates, and triallyl (iso)cyanurate.

Unsaturated polyester resins that can be cured by the cyclic ketone peroxides according to the present invention usually include an unsaturated polyester and one or more ethylenically unsaturated monomers. Suitable polymerizable monomers include styrene, α-methylstyrene, p-methylstyrene, chlorostyrenes, bromostyrenes, vinylbenzyl chloride, divinylbenzene, diallyl maleate, dibutyl fumarate, triallyl phosphate, triallyl cyanurate, diallylphthalate, diallyl fumarate, methyl (met)acrylate, n-butyl (met)acrylate, ethyl acrylate, and mixtures thereof, which are copolymerizable with the unsaturated polyesters. The unsaturated polyesters are, for example, polyesters as they are obtained by esterifying at least one ethylenically, unsaturated di- or polycarboxylic acid, anhydride or acid halide, such as maleic acid, fumaric acid, glutaconic acid, itaconic acid, mesaconic acid, citraconic acid, allylmalonic acid, tetrahydrophthalic acid, and others, with saturated and unsaturated di- or polyols, such as ethylene glycol, diethylene glycol, triethylene glycol, 1,2- and 1,3-propanediols, 1,2-, 1,3- and 1,4-butanediols, 2,2-dimethyl-1,3-propanediols, 2-hydroxymethyl-2-methyl-1,3-propanediol, 2-buten-1,4-diol, 2-butyn-1,4-diol, 2,4,4-trimethyl-1,3-pentanediol, glycerol, pentaerythritol, mannitol, and others.

The di- or polycarboxylic acids may be partially replaced by saturated di- or polycarboxylic acids, such as adipic acid, succinic acid and others, and/or by aromatic di- or polycarboxylic acids, such as phthalic acid, trimellitic acid, pyromellitic acid, isophthalic acid and terephthalic acid. The acids used may be substituted by groups such as halogen. Suitable halogenated acids include, for example, tetrachlorophthalic acid and tetrabromophthalic acid.

Finally, the polymerization process of the present invention can be employed to introduce functional groups into (co)polymers. This may be accomplished by employing a peroxide of the formulas I–III which contains one or more functional "R" groups attached thereto. These functional groups will remain intact in the free radicals formed by the cyclic ketone peroxides and thus are introduced into the (co)polymer. Conventional polymerization conditions and equipment may be used to achieve this object of the present invention.

In the case of unsaturated polyester ("UP") resins the application of the cyclic ketone peroxides is confined to temperatures >100° C. For these temperatures the preparation Trigonox C (t-butyl peroxy benzoate; hereinafter also referred to as "Tx C") is commercially used to a large extent, mostly in combination with more reactive peroxides such as t-butyl peroxy-2-ethylhexanoate (Trigonox 21) or bis(4-t-butylcyclohexyl peroxy-dicarbonate (Perkadox 16).

Usually, a temperature of about 100–250° C. and more preferably about 100–200° C., is employed. The heating time is generally between 0.1 and 30 minutes and, more preferably, between 0.5 and 5 minutes. The reaction is most preferably carried out in a moulding press or pulltrusion die.

The advantages of cyclic ketone peroxides according to the invention in the UP application area compared with t-butyl peroxy benzoate are the inability of benzene formation and reduction of other volatiles such as t-butanol, which are environmental issues. It has been found that cyclic ketone peroxides provide an improved long term stability of the formulations to be used for HPM or pulltrusion, compared with non-cyclic counterparts such as methyl isopropyl ketone Type 3.

The invention is further illustrated by the following examples which are not to be construed as limiting the invention in any way. The scope of the invention is to be determined from the claims appended hereto.

EXPERIMENTAL

Materials Employed

Monomers:
Styrene; methyl methacrylate; methacrylic acid; butyl acrylate; hydroxyethyl methacrylate.
Unsaturated polyester resins:
Palatal® P17 and Palatal® P18, both ex BASF
Fillers/additives:
Synolite® 7233-M-1 (LP additive, ex DSM)
Calcium carbonate Durcal® 5
Thickening agent Luvatol® MK35
6 mm chopped glass fibers, ex Vetrotex
Nacconol® 90 F (sodium dodecyl benzene sulphonate ex Stephan Chemie)
Gohsenol® C500 (PVA, ex Nippon Gohsei)
Internal release agent: zinc stearate
Tricalcium phosphate (C13-08, ex Budenheim)
Solvents:
Solvesso® 100 (aromatic C8-11 solvent, ex Exxon Chemicals)
Exxate® 700 (isoheptylacetate mixture, ex Exxon Chemicals)
Initiators:
t-Butyl peroxybenzoate (Trigonox C, Akzo Nobel). [Theoretical active oxygen content 8.24%].
t-Butyl peroxy-2-hexanoate (Trigonox 21, Akzo Nobel). [Total active oxygen content 7.0%].
t-Butyl peroxy-3,3,5-trimethylhexanoate (Trigonox 42S, Akzo Nobel). [Theoretical active oxygen content 6.94%].
Di-t-butyl peroxide (Trigonox B, Akzo Nobel). [Theoretical active oxygen content 10.83%].
t-Butyl peroxy-2-ethylhexylcarbonate (Trigonox 117, Akzo Nobel). [Theoretical active oxygen content 6.50%].
1,1-Bis(t-butylperoxy) cyclohexane, 75% in high viscous mineral oil (Trigonox 22-E75, Akzo Nobel). [Theoretical active oxygen content 12.29%].
Dibenzoyl peroxide (Lucidol, Akzo Nobel). [Theoretical active oxygen content 6.61%].
Methylethyl ketone peroxide (Butanox LPT, Akzo Nobel). [Total active oxygen content 8.5%].
Methylethyl ketone peroxide (MEKP-T3). [Total active oxygen content 11.49%].
Methylisopropyl ketone peroxide (MIPKP-T3). [Total active oxygen content 8.24%].
Cyclic methylethyl ketone peroxide (MEKP-cyclic). 5 [Theoretical active oxygen content 18.1%].
Methylisobutyl ketone peroxide (Trigonox 233, Akzo Nobel). [Total active oxygen content 8.04%].
Cyclic methylisobutyl ketone peroxide (MIBKP-cyclic). [Theoretical active oxygen content 13.8%].
Cyclic methylisopropyl ketone peroxide (MIPKP-cyclic). [Theoretical active oxygen content 15.7%].
Cyclic 2-methylcyclohexanone peroxide (2-MCHP-cyclic). [Theoretical active oxygen content 13.0%].
Acetylacetone endo peroxide (ACAC endo). [Theoretical active oxygen content 24.2%].
Cyclic diethylketone peroxide (DEKP-cyclic) [Theoretical active oxygen content 15.67%].
3,4-Dimethyl-3,4-diphenylhexane (Perkadox 58, Akzo Nobel) [About 95% active material].

METHODS USED IN THE EXAMPLES

Determination of total active oxygen content of the cyclic and non-cyclic peroxides used The total active oxygen content was measured by placing 50 ml of glacial acetic acid in a 250 ml round-bottomed flask fitted with a ground glass joint, an inlet tube for nitrogen gas, a heating mantle and a 70 cm. long air condenser. Nitrogen gas was then passed over the liquid with heating until the liquid boiled. After 2 minutes of boiling, 5 ml of 770 g/l potassium iodide solution was added and a sample containing approximately 2 meq of active oxygen was added to the reaction mixture with mixing. The air condenser was then connected and the contents of the flask were heated rapidly to boiling and maintained at moderate boiling for 30 minutes. Water (50 ml) was then added through the condenser and the condenser w as removed from the flask. The reaction mixture was then immediately titrated with a 0.1 N sodium thiosulphate solution until the yellow color disappeared. A blank should be run alongside this titration.

The total active oxygen may then by calculated by subtracting the volume in ml of sodium thiosulphate solution used in the blank from the amount used in the titration, multiplying this figure by the normality of the sodium thiosulphate solution and then by 800, and finally dividing by the mass of the peroxide sample in milligrams.

Determination of the active oxygen content of the non-cyclic peroxides used

The active oxygen content was measured by placing 20 ml of glacial acetic acid in a 200 ml round-bottomed flask fitted with a ground glass joint and an inlet tube for nitrogen gas. Nitrogen gas was then passed over the surface of the liquid. After 2 minutes, 4 ml of 770 g/l potassium iodide solution was added and a sample containing approximately 1.5 meq of active oxygen was added to the reaction mixture with mixing. The reaction mixture was allowed to stand for at least 1 minute at 25° C.±5° C. The reaction mixture was then titrated with a 0.1 N sodium thiosulphate solution to colorless end point adding 3 ml of 5 g/l starch solution towards the end of the titration. A blank should be run alongside this titration.

The active oxygen is then calculated by subtracting the volume in ml of sodium thiosulphate solution used in the blank from the amount used in the titration, multiplying this figure by the normality of the sodium thiosulphate solution and then by 800, and finally dividing by the mass of the peroxide sample in milligrams.

Analysis of the resulting resins

Solids content: Solids content were determined as percentage non-volatile material (30 min. at 150° C.).

Mw and dispersity (D): Molecular weights were determined by Gel Permeation Chromatography using polystyrene standards.

Residual styrene: Residual styrene was determined by GC on a solution of the polymer in dichloromethane using n-butylbenzene or t-butylbenzene as an internal standard.

In the following examples, all amounts are given in percent by weight, based on the amount of monomer employed, unless otherwise specified.

Synthesis Examples

Preparation of MEKP-cyclic in Solvesso® 100 (Composition A)

To a stirred mixture of 17.3 g methylethyl ketone, 8.0 g solvesso 100, 4.4 g demi-water and 16.8 g sulfuric acid (70%), 11.7 g of hydrogen peroxide (70%) was added in 15 minutes at 20° C. After a postreaction of 180 minutes at this temperature the organic layer was separated. The organic layer was treated 3 times with 16.0 g sodium hydroxide 2N under stirring for 10 minutes at 20° C. The organic layer was washed twice with 10.0 g demi-water. The washed organic layer was dried with 1.0 g magnesium sulfate dihydrate and filtrated. The dried organic layer is composition A, weight 13.2 g.

Preparation of MIPKP-cyclic in isododecane (Composition B)

To a stirred mixture of 17.2 g methylisopropyl ketone, 4.0 g isododecane and 19.6 g sulfuric acid (50%), 9.7 g of hydrogen peroxide (70%) was added in 10 minutes at 40° C. After a postreaction of 355 minutes at this temperature the organic layer was separated. To the organic layer 10 g of water was added and the mixture was neutralized with 5.5 g sodium hydroxide 4N. The neutralized organic layer was evaporated in vacuo at 20 mbar and 20° C. The residue was dried with 0.5 g magnesium sulfate dihydrate and filtrated. The dried organic layer is composition B, weight 12.0 g.

Preparation of MIPKP-cyclic in dibutylphthalate (Composition C)

To a stirred mixture of 17.6 g methylisopropyl ketone, 8.0 g dibutylphthalate and 9.8 g sulfuric acid (50%), 9.7 g of hydrogen peroxide (70%) was added in 15 minutes at 40° C. After a postreaction of 240 minutes at this temperature the reaction mixture was poured into 120 ml of demi-water and stirred for 15 minutes. In order to obtain a good separation 10 ml of a saturated ammonium sulfate solution was added. The organic layer was separated and treated 3 times with 10 g sodium hydroxide 4N at 40° C. for 10 minutes. The organic layer was washed twice with 10 ml saturated sodium chloride solution. The washed organic layer was dried with 0.5 g magnesium sulfate dihydrate, filtrated and filter washed with 2.0 g dibutylphthalate. To the dried organic layer 8 g dibutylphthalate was added, giving composition C, weight 22.3 g.

Preparation of MIBKP-cyclic in isododecane (Composition D)

To a stirred mixture of 20.0 g methylisobutyl ketone, 3.0 g isododecane and 19.6 g sulfuric acid (50%), 9.7 g of hydrogen peroxide (70%) was added in 15 minutes at 20° C. After a postreaction of 300 minutes at this temperature, the temperature was increased to 25° C. for another postreaction of 1080 minutes at this temperature, followed by a temperature increase to 30° C. and a postreaction of 120 minutes at this temperature, followed by a temperature increase to 40° C. and a postreaction of 240 minutes at this temperature. The organic layer was then separated. To the organic layer 15.0 g sodium hydroxide 4N was added and the mixture was stirred for 120 minutes at 40° C. The neutralized organic layer was separated and washed twice with water. The mixture was evaporated in vacuo at 20 mbar and 20° C. The residue still contained 2 layers. The clear organic layer was decanted and dried with 0.3 g magnesium sulfate dihydrate and filtrated. The dried organic layer is composition D, weight 11.6 g.

Preparation of DEKP-cyclic in isododecane (Composition E)

To a stirred mixture of 17.6 g diethyl ketone, 8.0 g isododecane and 9.8 g sulfuric acid (50%), 9.7 g of hydrogen peroxide (70%) was added in 15 minutes at 40° C. After a postreaction of 360 minutes at this temperature the organic layer was separated. The organic layer was treated 3 times with 20 ml sodium hydroxide 4 N for 30 min at 40° C. The organic layer was separated and washed twice with 10 ml saturated sodium chloride solution at 20° C. The organic layer was dried with magnesium sulfate dihydrate, filtrated and the filter was washed with 2.0 g isododecane. The dried organic layer was diluted with 10.4 g isododecane giving composition E, weight 43.9 g.

Preparation of MEKP-T3 in isododecane (Composition F)

To a stirred mixture of 21.6 g methylethyl ketone, 22.5 g isododecane and 5.9 g sulfuric acid (50%), 23.3 g of hydrogen peroxide (70%) was added in 60 minutes at 20° C. After a postreaction of 60 minutes at this temperature the organic layer was separated. The organic layer was neutralized with 3.0 g solution of sodium bicarbonate (6%). The neutralized organic layer was dried with 1.3 g magnesium sulfate dihydrate and filtrated. The dried organic layer was diluted with 7.2 g isododecane giving composition F, weight 55.2 g.

Preparation of MIPKP-T3 in Solvesso® 100 (Composition G)

To a stirred mixture of 126.6 g methylisopropyl ketone, 150 g hexane and 2,3.2 g sulfuric acid (50%), 112.2 g of hydrogen peroxide (70%) was added in 30 minutes at 20° C. After a postreaction of 90 minutes at this temperature the organic layer was separated. To the organic layer 30.0 g solution of sodium bicarbonate (6%) was added followed by the dosing of 100 g solution of sodium sulfite (20%) in 30 minutes at 20° C. The reaction mixture was stirred for an additional 30 minutes at this temperature. The obtained organic layer was washed with 100 ml of water and dried with 15 g magnesium sulfate dihydrate and filtrated. The weight of the dried organic layer was 281 g. To 150 g of this solution 70 g solvesso 100 was added. The mixture was evaporated in a rotavapor at 20° C. and 10 mbar. The residue is composition G, weight 136 g.

Preparation of 2-MCHP in styrene (Composition H)

To a stirred mixture of 150 g 2-methylcyclohexanone, 540 g acetic acid (99%) and 5.7 g sulfuric acid (50%), 73 g of hydrogen peroxide (70%) was dosed in 45 min. at 50–55° C. After a postreaction of 180 min. at 50° C. the reaction mixture was poured into 1500 ml of water. The obtained mixture was extracted 3 times with 100 ml of pentane. The pentane extracts were combined and subsequently washed 3 times with 100 ml of water, 100 ml of sodium bicarbonate solution (6%) and 100 ml of water. The washed pentane extracts were placed in to a glass dish and the volatile component s w ere allowed to evaporate. The residue, sticky crystals, weighted 42 g. To the residue was added 44.3 g of styrene. The obtained mixture is composition H, weight 86.3 g.

Preparation of ACAC endo in dibutylphthalate (Composition I)

To 100 g acetylacetone, 97 g hydrogen peroxide (70%) was dosed in 30 min at 25–28° C. After a postreaction of 30 min at 40° C. the reaction mixture was evaporated at 40–45° C. and 10 mbar. The residue weight 156 g, which formed on cooling to 20° C. a waxy crystal mass. A mixture of 31 g of the waxy crystal mass and 40 g of acetic acid (99%) was heated to 80° C. and stirred for an additional 30 min at this temperature. To the obtained mixture 75 g of dibutylphthalate was added. After cooling of the reaction mixture, 100 ml of water was added. The organic layer was separated and washed 5 times with 50 ml of water. The washed organic layer was subsequently dried with 5 g magnesium sulfate dihydrate and filtrated through a G-2 glass filter. The dried organic layer was diluted with 50 g dibutylphthalate to composition I, weight 50 g.

Preparation of MIPKP-cyclic in Primol® 352 (Composition J)

To a stirred mixture of 105.5 g methylisopropyl ketone and 66.6 g hydrochloric acid (36%) which was precooled to 0° C., 72.6 g of hydrogen peroxide (30%) was added in 30 min at this temperature. After a postreaction of 300 min at this temperature, 200 g of water and 40 g of Primol® 352 was added to the reaction mixture. The organic layer was separated and washed 3 times with 50 ml of sodium hydroxide 4 N. The obtained organic layer was then washed 3 times with 50 g of water ti neutral, dried with 5 g magnesium sulfate dihydrate and filtrated. The dried organic layer was evaporated in vacuo at 25 mbar and 35° C. The residue was dried with 0.5 g magnesium sulfate dihydrate and filtrated. The dried residue was diluted with 96.7 g Primol® 352, giving composition J, weight 174.5 g.

Preparation of MEKP-cyclic in Primol® 352 (Composition K)

To a stirred mixture of 28.8 g methylethyl ketone, 13.5 g Primol 352 and 14.0 g sulfuric acid (70%), 19.4 g of hydrogen peroxide (70%) was added in 20 min at 40° C. After a postreaction of 120 min at this temperature, the organic layer was separated and treated with 10.0 g of a solution of sodium hydrogencarbonate (6%) under stirring for 10 min at 20° C. The neutralized organic layer was dried with 1.0 g magnesium sulfate dihydrate and filtrated. The dried organic layer was composition K, weight 41.9 g.

Analysis of the prepared ketone peroxides

| Composition | Total % A.O.[1] | % A.O. non-cyclic ketone peroxides[2] | % A.O. cyclic ketone peroxides[3] |
|---|---|---|---|
| A | 9.88 | 0.59 | 9.29 |
| B | 7.86 | 0.44 | 7.42 |
| C | 2.11 | n.d. | n.d. |
| D | 8.03 | 0.49 | 7.54 |
| E | 2.09 | n.d. | n.d. |
| F | 11.49 | 11.08 | 0.41 |
| G | n.d. | 8.24 | n.d. |
| H | 2.00 | n.d. | n.d. |
| I | 1.35 | n.d. | n.d. |
| J | 6.88 | n.d. | n.d. |
| K | 10.92 | 0.33 | 10.59 |
| Tx 233[4] | 8.04 | 7.9 | 0.10 |

[1] Determination of total % active oxygen (A.O.) of the peroxides used (non-cyclic and cyclic): see Methods Used in the Examples.
[2] Determination of the % active oxygen (A.O.) of the non-cyclic ketone peroxides: see Methods Used in the Examples
[3] The difference of 1 minus 2 gives % active oxygen (A.O.) of the cyclic ketone peroxides.
[4] Commercial product on the basis of non-cyclic MIBKP-T3
n.d.: Not determined Testing of cyclic ketone peroxides as polymerization initiators I. High Temperature Curing (>100° C.)

The area of High Temperature Curing consists of Hot Press Moulding (HPM) such as SMC, BMC, ZMC, TMC but also pulltrusion. These techniques are described in the Handbook of Thermoset Plastics, Chapter 4: "Unsaturated Polyester and Vinyl Ester Resins", ed. S. H. Goodman.

Comparative Example A

A BMC formulation was prepared by mixing the ingredients by means of a Z-blade Mixer for 5 min. After a thickening period of 7 days the BMC was pressed at 150° C./75 bar pressure on SMC-Reactomer of SMC Technologie Aachen. The curing performance was measured by changes in displacement, temperature and pressure, measured by senors in the mould cavity. The residual styrene was determined by extraction in dichloromethane followed by GC-analysis.

The BMC formulation consists of:
100 parts of resin (e.g. Palatal® P17 ex BASF)
200 parts of filler Durcal® 5
75 parts of 6 mm chopped glass fibers
5 parts zinc stearate
5 parts of styrene
1.5 parts Luvatol® MK35 (thickening agent)
1.5 parts of Trigonox C The BMC was pressed at 150° C. for 150 seconds. The Maximum Flow Time (MFT) in sec., Minimum Moulding Time (MMT) in sec. and Residual Styrene (RS) in % are mentioned in Table 1 below.

Example 1

Instead of 1.5% of Trigonox C, the cyclic methylisopropyl ketone trimer (MIPKP cyclic) in Primol 352 (Composition J) was used on equal "active oxygen" content compared with Trigonox C. The shelflife of the prepared BMC paste showed to be longer than two months at 30° C. The results are mentioned in Table 1 below.

Comparative Example B

Instead of 1.5% of Trigonox C, the non-cyclic methylisopropyl ketone peroxide (MIPKP T3) in Solvesso® 100 was used on equal active oxygen content compared with Trigonox C. The shelflife of the prepared BMC paste showed to be less than 1 week at 30° C. The results are mentioned in Table 1 below.

Comparative Example C

For application with a Class A surface a L(ow) P(rofile) additive, the Synolite 7233-M-1 was used. As binder systems the Palatal P18 (65 parts) and the Synolite 7233-M-1 (35 parts) were used instead of Palatal P17. As initiator system a combination of Trigonox C and Trigonox 21 was used in a ratio of 1.25/0.25%. The BMC formulation was prepared in the same way as described in Example 1. The results are mentioned in Table 1 below.

Example 2

Instead of 1.25% of Trigonox C (see Comparative Example C), the cyclic methyl isopropyl ketone (MIPKP-cyclic) in DBP (Composition C) was used on equal active oxygen content compared with Trigonox C. The results are mentioned in Table 1 below.

Example 3

Instead of 1.25% of Trigonox C (see Comp. Example C), the cyclic 2-methylcyclohexanone peroxide (2-MCHP-cyclic) in styrene (Composition H) was used on equal active oxygen content compared with Trigonox C. The results are mentioned in Table 1 below.

Example 4

Instead of 1.5% of Trigonox C (see Comparative Example A), the acetyl acetone cyclic peroxide in dibutylphthalate (Composition I) was used on equal active oxygen content compared with Trigonox C. The results are mentioned in Table 1 below.

TABLE 1

Results of BMC moldings

| | Peroxide (%) | MFT (sec) | MMT (sec) | RS (%) |
|---|---|---|---|---|
| Ex. A; Trigonox C | 1.5 | 19 | 41 | 0.05 |
| Ex. 1; MIPKP cyclic | 1.5 | 19 | 42 | 0.02 |
| Ex. B; MIPKP T3 | 1.5 | 15 | 36 | 0.3 |
| Ex. C; Trigonox C/Trigonox 21 | 1.25/0.25 | 12 | 30 | 0.02 |
| Ex. 2; MIPKP cyclic/Tx21 | 1.25/0.25 | 12 | 30 | 0.04 |
| Ex. 3; 2-MCHP cyclic/Tx21 | 1.25/0.25 | 13 | 31 | 0.18 |
| Ex. 4; ACAC endo | 1.5 | 31 | 79 | 0.67 |

II. High solids acrylics

Cyclic ketone peroxides were tested for the production of high solids acrylic resin. The properties of the resins produced using the cyclic ketone peroxides were compared to those of resins produced using non-cyclic ketone derived peroxides and initiators currently used in industry for this type of polymerization.

The initiators were tested in polymerization under the following conditions:

Monomer mixture 40 pbw butyl acrylate 28 pbw hydroxyethyl methacrylate 20 pbw styrene 10 pbw methyl methacrylate 2 pbw methacrylic acid +40 pbw solvent Initiator concentration: As indicated in Table 2 below.

The initiator was added to the monomers in the amount indicated in Table 2 below. This mixture was added to the solvent kept at the indicated reaction temperature in about 4 hrs. The reaction was continued for about 1 hr after the addition of the monomers/initiator mixture was completed.

Results for the developmental cyclic ketone peroxides and comparative non-cyclic ketone peroxides and initiators currently used in industry are given in Table 2 below.

TABLE 2

High solids acrylics

| | | | Conditions of polymerization | | Characteristics of the resulting acrylic resin | | | |
|---|---|---|---|---|---|---|---|---|
| Example | Initiator | Solvent | Temp. (° C.) | Initiator conc. (meq/100 g) | Solids (%) | Mw (g/mol) | D | Color |
| Cyclic ketone peroxides | | | | | | | | |
| 5 | MEKP-cyclic | Solv. 100 | 165 | 15 | 70.2 | 6.700 | 2.0 | clear |
| 6 | (Compos. A) | Solv. 100 | 165 | 30 | 70.0 | 4.400 | 1.8 | clear |
| 7 | | Solv. 100 | 165 | 60 | 70.9 | 3.800 | 1.7 | clear |
| 8 | | Exx. 700 | 180 | 30 | 70.4 | 2.700 | 1.6 | clear |
| 9 | MIBKP-cycl. | Exx. 700 | 157 | 30 | 70.8 | 4.400 | 2.0 | clear |
| 10 | (Compos. D) | Solv. 100 | 165 | 30 | 71.8 | 4.500 | 1.8 | clear |
| 11 | | Exx. 700 | 180 | 30 | 70.6 | 3.600 | 1.8 | clear |
| 12 | MIPKP-cycl. | Solv. 100 | 165 | 30 | 70.6 | 4.200 | 1.8 | clear |
| 13 | (Compos. B) | Exx. 700 | 180 | 30 | 70.9 | 3.400 | 1.7 | clear |
| 14 | DEKP-cyclic (Compos. E) | Solv. 100 | 165 | 30 | 65.5 | 5.200 | 1.8 | clear |
| Non-cyclic ketone peroxides | | | | | | | | |
| D | MEKP-T3 | Solv. 100 | 165 | 30 | 67.6 | 6.400 | 1.9 | yellow >200 Apha |

TABLE 2-continued

High solids acrylics

| | | | Conditions of polymerization | | Characteristics of the resulting acrylic resin | | | |
|---|---|---|---|---|---|---|---|---|
| Example | Initiator | Solvent | Temp. (° C.) | Initiator conc. (meq/100 g) | Solids (%) | Mw (g/mol) | D | Color |
| E | (Compos. F) Tx 233 | Solv. 100 | 165 | 30 | 67.0 | 6.300 | 1.8 | yellow >200 Apha |
| F | MIPK-T3 (Compos. G) | Solv. 100 | 165 | 30 | 68.1 | 7.000 | 2.0 | yellow >200 Apha |
| | | Other initiators currently used in industry | | | | | | |
| G | Tx C | Solv. 100 | 165 | 30 | 71.9 | 4.700 | 1.9 | clear |
| H | | Exx. 700 | 180 | 30 | 72.0 | 3.600 | 1.8 | clear |
| I | Tx 42S | Solv. 100 | 165 | 30 | 71.3 | 4.100 | 1.7 | clear |
| J | | Exx. 700 | 180 | 30 | 69.9 | 3.200 | 1.6 | clear |
| K | Tx B | Solv. 100 | 165 | 30 | 74.3 | 5.500 | 1.9 | clear |
| L | | Exx. 700 | 180 | 30 | 72.0 | 3.300 | 1.7 | clear |

From these experiments it can be concluded that the cyclic ketone peroxides according to the invention can be used to prepare clear, colorless low molecular weight acrylic resins, whereas the polymerization initiated by their non-cyclic counterparts is a fierce, heavily refluxing reaction, which gives lower conversion and results in colored, relatively high molecular weight resins.

III. Expandable Polystyrene (EPS)

In order to judge its performance in EPS, cyclic methylisopropyl-ketone peroxide was tested as second stage initiator (to reduce residual styrene) and compared to other initiators applied to this purpose in expandable polystyrene production.

Conditions of polymerization

The suspension polymerization of styrene was carried out in a one liter stainless steel autoclave equipped with one baffle and a three blade impeller.

| Recipe | |
|---|---|
| Water | 260 g |
| Styrene | 250 g |
| Tricalcium phosphate | 1.25 g |
| Polyvinylalcohol | 25 mg |
| Na-dodecylbenzenesulphonate | 20 mg |
| Dibenzoyl peroxide | 0.98 meq/100 g styrene |
| Second stage initiator | 0.46 meq/100 g styrene |
| Temperature scheme | |
| 20–90° C. | 1.56° C./min. heating rate |
| 90° C. | 4.25 hrs (first stage) |
| 90–130° C. | 0.66° C./min. heating rate |
| 130° C. | 3 hrs (second stage) |

At the end of the first stage the reactor was pressurized with nitrogen (5 bars). After polymerization the reaction mixture was acidified to pH 1 and stirred for approximately 30 min to remove all tricalcium phosphate.

Subsequently the beads were:

washed with demineralized water to pH >6 washed with water containing 25 mg/kg of Armostat 400 dried for 5 hours at room temperature.

The results of the evaluation are given in Table 3 below.

TABLE 3

Expandable polystyrene

| Example | Initiator | Characteristics of the resulting EPS Residual styrene (% w/w) |
|---|---|---|
| 15 | MIPKP-cyclic (Composition B) | 0.24 |
| | Non-cyclic ketone peroxides | |
| M | MIPKP-T3 | 4.4 |
| | Other initiators currently used in industry | |
| N | Trigonox C | 0.21 |
| O | Trigonox 117 | 0.25 |

It can be concluded from these experiments that the cyclic methylisopropyl ketone peroxide is an effective second stage catalyst to reduce residual styrene in EPS. The resulting residual styrene level is much lower than the level obtained when using non-cyclic methylisopropyl ketone peroxide and similar to that obtained using commercial initiators currently used in industry.

IV. Styrene butylacrylate copolymers

Certain cyclic ketone peroxides according to the invention were tested as initiators for the mass copolymerization of styrene and n-butyl acrylate. Mass polymerizations were carried out in 3 ml brown glass ampoules. The monomer mixture of styrene (80 parts by weight) and n-butylacrylate (20 parts by weight) was polymerized at 120° C., using an initiator concentration of 0.75 meq/100 g of monomer mixture. The results are given in Table 4 below.

TABLE 4

| | | Characteristics of the styrene/butacrylate resin | | | |
|---|---|---|---|---|---|
| Example | Initiator | Conversion after 10 hrs (%) | Mw kg/mol | Mn kg/mol | D |
| 16 | MIPKP-cyclic (Composition B) | 98.9 | 450 | 200 | 2.2 |

TABLE 4-continued

| | | Characteristics of the styrene/butacrylate resin | | | |
|---|---|---|---|---|---|
| Example | Initiator | Conversion after 10 hrs (%) | Mw kg/mol | Mn kg/mol | D |
| | Non-cyclic ketone peroxides | | | | |
| P | MIPKP-T3 (Composition G) | 79.6 | 430 | 180 | 2.3 |
| | Other initiators currently used in industry | | | | |
| Q | Trigonox C | 99.9 | 310 | 120 | 2.6 |
| R | Trigonox 22-E75 | 96.2 | 370 | 150 | 2.4 |

It can be concluded from these experiments that the cyclic ketone peroxides according to the invention are excellently suited for the high conversion bulk polymerization of styrene acrylic copolymers. The resulting resin has a higher molecular weight than obtained when using commercially available initiators like Trigonox C and Trigonox 22-E75. The non-cyclic ketone peroxide MIPKP-T3 does not provide an acceptable conversion.

V. Styrene mass-polymerization

To evaluate the effectiveness of cyclic ketone derived peroxides as chaser catalyst to reduce residual styrene in the last stages of styrene mass polymerization, a styrene polymer (Mw 260.000, Mn 95.000) was swollen with 20% styrene monomer. To 100 g of this polymer/monomer mixture 0.03 meq. initiator was added. Mass polymerizations were carried out in 3 ml brown glass ampoules. These ampoules were put in an oil bath is at room temperature. Temperature was increased to 180° C. in about 20 min. and kept at 180° C. for 4 hrs, after which the ampoules were taken form the oil bath and allowed to cool to room temperature. Residual styrene levels after 4 hrs of polymerizatior as determined by GC are shown in Table 5.

TABLE 5

| Example | Initiator | Residual styrene concentration (% w/w) |
|---|---|---|
| 17 | MEKP-cyclic (Composition K) | 3.0 |
| S | No initiator (thermal) | 5.5 |
| | Other initiators currently used in industry | |
| T | Perkadox 58 | 4.5 |

From these experiments it can be concluded that the cyclic ketone peroxide used is more efficient in the reduction of residual styrene than the commercial product Perkadox 58.

We claim:

1. A polymerization process which comprises the (co)-polymerization of unsaturated monomers initiated by at least one organic peroxide under conditions whereby a least some of said organic peroxide is decomposed, wherein at least 20% of the total active oxygen content of the organic peroxide is attributable to at least one cyclic ketone peroxide selected from peroxides represented by the formulas I–III:

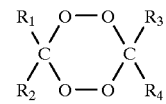

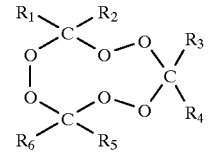

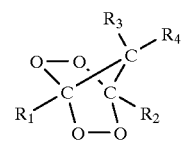

wherein $R_1$–$R_6$ are independently selected from the group consisting of hydrogen, $C_1$–$C_{20}$ alkyl, $C_3$–$C_{20}$ cycloalkyl, $C_6$–$C_{20}$ aryl, $C_7$–$C_{20}$ aralkyl and $C_7$–$C_{20}$ alkaryl, which groups may include non-cyclic or branched alkyl moieties; and each $R_1$–$R_6$ may be optionally substituted with one or more groups selected from $C_1$–$C_{20}$ alkyl, linear or branched, $C_3$–$C_{20}$ cycloalkyl, $C_6$–$C_{20}$ aryl, $C_7$–$C_{20}$ aralkyl, hydroxy, $C_1$–$C_{20}$ alkoxy, $C_6$–$C_{20}$ aryloxy, $C_7$–$C_{20}$ aralkoxy, $C_7$–$C_{20}$ alkaryloxy, $R_1C(O)$ O—, $R_1OC(O)$—, halogen, carboxy, nitrile and amido; or $R_1/R_2$, $R_3/R_4$ and $R_5/R_6$ each may, together with the carbon atom to which they are attached, from a 3 to 20 atoms membered cycloaliphatic ring which may be optionally substituted with one or more groups selected from the group consisting of $C_1$–$C_{20}$ alkyl, non-cyclic or branched, $C_3$–$C_{20}$ cycloalkyl, $C_6$–$C_{20}$ aryl, $C_7$–$C_{20}$ aralkyl, hydroxy, $C_1$–$C_{20}$ alkoxy, $C_6$–$C_{20}$ aryloxy, $C_7$–$C_{20}$ aralkoxy, $C_7$–$C_{20}$ alkaryloxy, $R_1$—$C(O)O$—, $R_1OC(O)$—, halogen, carboxy, nitrile and amido.

2. The process of claim 1 wherein in the formulas I–III, $R_1$–$R_6$ are independently selected from hydrogen and $C_1$–$C_5$ alkyl groups.

3. The process of claim 1 wherein the polymerization reaction is carried out at a temperature of 50–450° C. and the total amount of organic peroxide is 0.001–25% by weight, based on the weight of the (co)polymer.

4. The process of claim 3 wherein the polymerization is carried out at a temperature of 100–350° C., the total amount of organic peroxide is 0.001–15% by weight, based on the weight of the monomers and at least 50% of the total active oxygen content employed in the process is attributed to one or more cyclic ketone peroxides of the formulas I–III.

5. The process of claim 1 wherein said organic peroxide comprises a peroxide selected from the group consisting of cyclic acetone peroxide, cyclic acetylacetone peroxide, cyclic methylethyl ketone peroxide, cyclic methylpropyl ketone peroxide, cyclic methylisopropyl ketone peroxide, cyclic methylbutyl ketone peroxide, cyclic methylisobutyl ketone peroxide, cyclic methl-n-amyl ketone peroxide, cyclic methylisoamyl ketone peroxide, cyclic methylhexyl ketone peroxide, cyclic methylheptyl ketone peroxide, cyclic ethylpropyl ketone peroxide, cyclic ethylbutyl ketone peroxide, cyclic ethylamyl ketone peroxide, cyclic diethyl ketone peroxide, cyclic cyclopentanone peroxide, cyclic cyclohexanone peroxide, cyclic 2-methylcyclohexanone peroxide, cyclic 3,5,5-trimethyl-cyclohexanone peroxide, cyclic cyclododecanone peroxide, and mixtures thereof.

6. The process of claim 1 wherein an unsaturated polyester resin is cured wherein said resin comprises an unsaturated polyester and one or more ethylenically unsaturated monomers.

7. The process of claim 1 wherein at least one of the unsaturated monomers is selected from substituted or unsubstituted vinyl aromatic monomers, olefins, ethylenically unsaturated carboxylic and dicarboxylic acids and derivatives thereof, ethylenically unsaturated nitriles and amides, butadiene, isoprene, chloroprene, vinyl esters, vinyl halides, vinyl ethers, and allyl compounds.

8. The process of claim 1 wherein the process is a bulk, solution, suspension, or emulsion process, the bulk and/or the solution processes comprising radical polymerization processes which are conducted at pressures up to 3500 bar.

* * * * *